May 9, 1933.  H. M. EHMANN  1,907,941
MOLDING APPARATUS
Filed Jan. 23, 1931   2 Sheets-Sheet 1
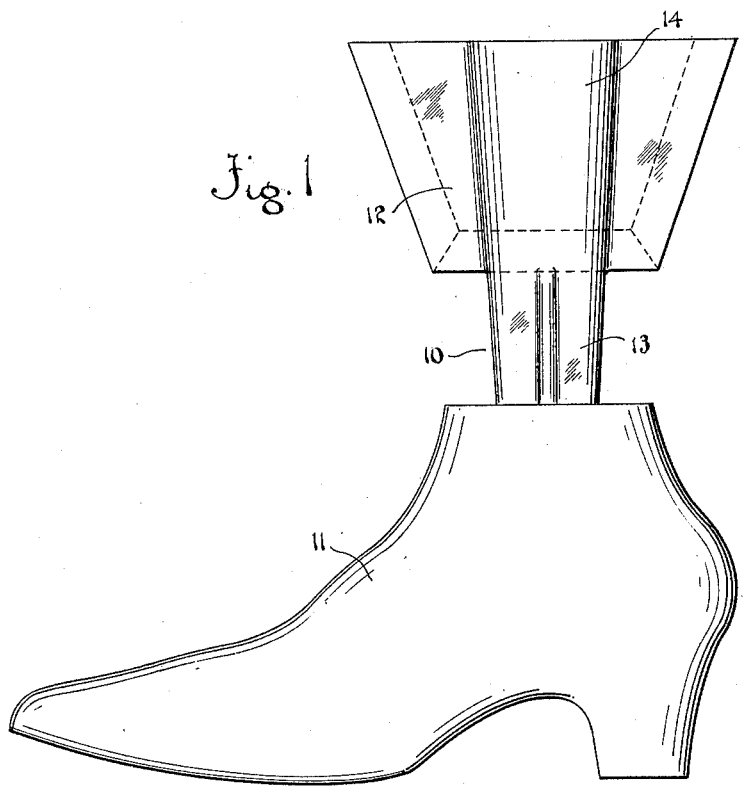
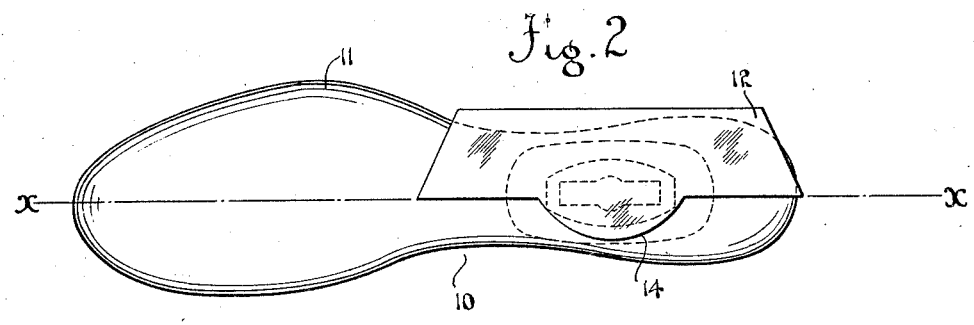
INVENTOR
Henry M. Ehmann
BY
Ely & Barrow
ATTORNEYS May 9, 1933.  H. M. EHMANN  1,907,941
MOLDING APPARATUS
Filed Jan. 23, 1931   2 Sheets-Sheet 2
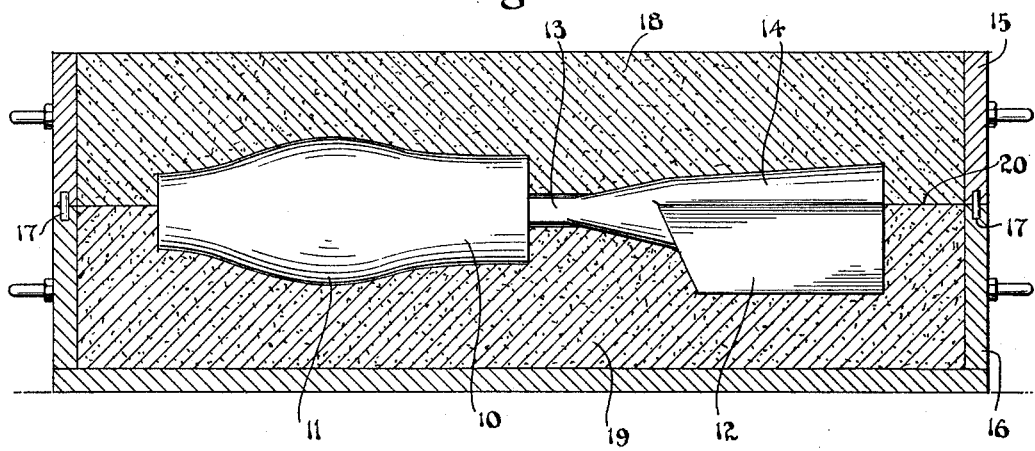
Fig. 3
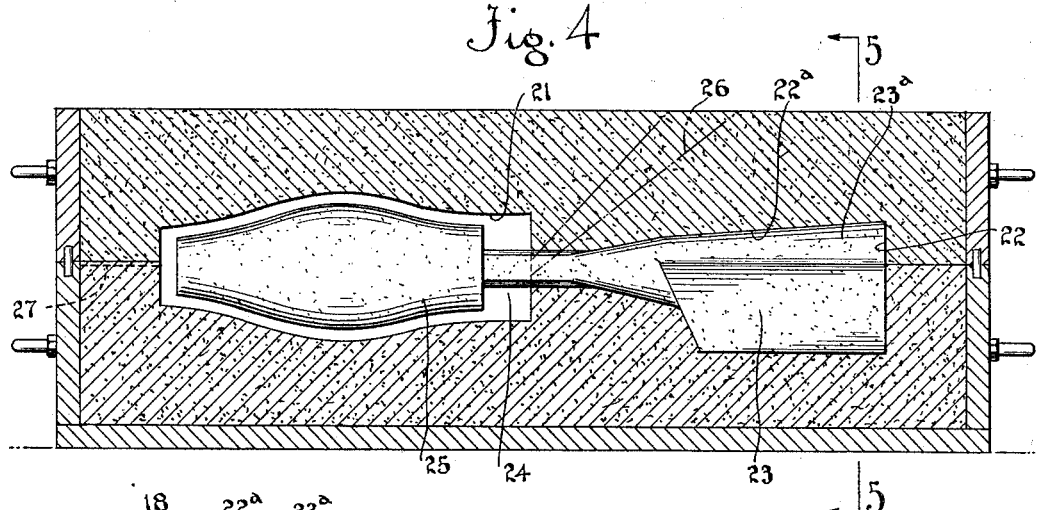
Fig. 4
Fig. 5
INVENTOR
Henry M. Ehmann
BY
ATTORNEYS Patented May 9, 1933

1,907,941

UNITED STATES PATENT OFFICE

HENRY M. EHMANN, OF AKRON, OHIO, ASSIGNOR TO THE AKRON BRONZE & ALUMINUM COMPANY, OF AKRON, OHIO, A CORPORATION OF OHIO

MOLDING APPARATUS

Application filed January 23, 1931. Serial No. 510,668.

This invention relates to molding apparatus, and more especially it relates to improved mold construction for the manufacture of metal castings.

In the illustrative embodiment of the invention depicted in the accompanying drawings, there is shown a mold for the casting of hollow metal shoe lasts such as are used in the manufacture of leather or rubber footwear. Such lasts require a smooth outer surface, they must be uniformly of proper size, and preferably are of uniform wall thickness. One or more of these desirable characteristics frequently are missing in lasts manufactured by ordinary molding methods wherein the sand core for the casting is supported in the molding cavity upon chaplets. For example, the latter are frequently displaced by the metal and thereby permit movement of the core, or they may not fuse with the casting metal if the latter is not sufficiently hot, with the result that subsequently they drop out of the casting and the latter is classed as defective.

The chief objects of this invention are to provide improved molding apparatus in which the use of chaplets is dispensed with; to produce castings of superior quality; and to avoid the production of defective castings. A more specific object is to provide a self-supporting core for use in a mold; and to provide a self-supporting core that is confined entirely within the mold.

Of the accompanying drawings:

Figure 1 is a side elevation of a pattern such as is used with the improved molding apparatus;

Figure 2 is a plan view thereof;

Figure 3 is a vertical section through a mold, and the pattern therein;

Figure 4 is a section of the mold shown in Figure 3, and a core mounted therein; and Figure 5 is a detail sectional view on the line 5—5 of Figure 4.

In general, the invention may be said to reside in the feature of a so-called "counterbalanced" core used with a sand mold. The term "counterbalanced" is used to designate a core which is so constructed and so arranged that the part thereof that is disposed within the matrix or cavity of the mold is self-supporting and requires no extraneous means such as chaplets to hold it properly positioned therein.

Referring now to Figures 1 and 2 of the drawings, the pattern 10 which is used to form the matrix in the mold comprises a portion 11 of the size and shape of the article to be molded, in this case a shoe last, and a portion 12 of the size and shape of a counterweight that is formed on the molding core to counterbalance the same, the portion 12 of the pattern being connected to the portion 11 by a neck 13 of the size and shape of an aperture to be formed in the finished casting, the neck 13 being attached to the shoe-shaped portion 11 at the ankle thereof.

As shown in Figure 1, the portion 12 of the pattern is trapezoidal in shape, and has three oblique or undercut marginal faces to provide suitable draft to permit its withdrawal from a sand mold. As shown in Figure 2, all of the portion 12 of the pattern is disposed on one side of the central plane of the pattern, indicated by the line $x$—$x$, except a central convex rib 14 constituting a continuation of a part of the neck 13. If desired, the pattern 10 may be made in two sections which divide along the central plane $x$—$x$ thereof.

As shown in Figure 3, the mold comprises the usual flask consisting of a cope 15, drag 16, registering dowels 17, 17, and upper and lower sand forms 18, 19 respectively, said forms meeting at a parting plane 20 coincident with the central plane $x$—$x$ of the pattern. The pattern 10 upon its removal from the mold leaves an internal recess therein, comprising a casting matrix 21 (Figure 4) and a cavity 22 connected therewith and adapted to receive the counterweight portion 23 of a sand core 24 which has a molding portion 25 of the size and shape of the cavity to be formed in the casting, the core portion 25 being positioned within the matrix 21 and uniformly spaced therefrom. The mold is provided with the usual sprue 26 through which molten metal is poured into the matrix 21, and one or more risers or vents 27 are formed in the mold at the parting plane thereof for venting air or gas from the matrix 21.

The counterweight portion of the core 24 is shaped complemental to the cavity 22 in the mold so as to fit nicely therein and thereby properly to position the mold portion 25 of the core in the matrix 21. The mass of the counterweight portion 23 is such as to support the molding portion 25 in proper position on the lower sand form 19 before the upper form 18 is mounted thereon. As shown in Figure 5, the counterweight portion 23 of the core is formed with a central convex rib 23$^a$ adapted to register with a complemental groove 22$^a$ formed by the pattern rib 14 in the upper mold form 18, the arrangement being such that if the core is not perfectly positioned in the lower molding form 19 before the upper form is mounted thereon, it will be shifted into perfect registry during the mounting of the upper form by the seating of the rib 23$^a$ in the groove 22$^a$.

The invention involves no radical departure from standard molding methods, and it accomplishes the several advantages set forth in the foregoing statement of objects.

Modifications are possible without departing from the spirit of the invention or the scope of the appended claims.

What is claimed is:

1. The combination in molding apparatus comprising upper and lower mold forms defining a molding cavity, and a core therein spaced from the upper and lower walls and end walls at one end of the mold cavity, said core being supported solely by an extension thereof at one end thereof fitting in and entirely confined in a cavity defined by said upper and lower sand forms as an extension from said molding cavity at the other end thereof, the extension of the core being of such mass as to counter-balance the core in the molding cavity whereby the core is supported without tilting by engaging in that portion of the extension cavity which is defined in the lower sand form.

2. The combination in molding apparatus comprising upper and lower mold forms defining a molding cavity, and a core therein spaced from the upper and lower walls and end walls at one end of the mold cavity, said core being supported solely by an extension thereof at one end thereof fitting in and entirely confined in a cavity defined by said upper and lower sand forms as an extension from said molding cavity at the other end thereof, the extension of the core being of such mass as to counter-balance the core in the molding cavity whereby the core is supported without tilting by engaging in that portion of the extension cavity which is defined in the lower sand form, the upper portion of said core extension and said cavity extension in the upper sand form being of curved outline to facilitate registry of the upper and lower forms.

HENRY M. EHMANN.